United States Patent
Grillo

(10) Patent No.: US 9,527,566 B2
(45) Date of Patent: Dec. 27, 2016

(54) THROTTLE DEVICE AND METHOD FOR PERSONAL WATERCRAFT

(71) Applicant: Kelly J. Grillo, Northfield, NJ (US)

(72) Inventor: Kelly J. Grillo, Northfield, NJ (US)

( * ) Notice: Subject to any disclaimer, the term of this patent is extended or adjusted under 35 U.S.C. 154(b) by 0 days.

(21) Appl. No.: 14/849,968

(22) Filed: Sep. 10, 2015

(65) Prior Publication Data

US 2016/0075421 A1    Mar. 17, 2016

Related U.S. Application Data

(60) Provisional application No. 62/049,678, filed on Sep. 12, 2014.

(51) Int. Cl.
| | |
|---|---|
| *B63H 21/21* | (2006.01) |
| *B63B 35/73* | (2006.01) |
| *B63B 35/85* | (2006.01) |
| *F16B 2/22* | (2006.01) |

(52) U.S. Cl.
CPC ........... *B63H 21/213* (2013.01); *B63B 35/731* (2013.01); *B63B 35/85* (2013.01); *F16B 2/22* (2013.01)

(58) Field of Classification Search
CPC ............................ B63B 35/731; B63H 21/213
USPC ........................................................ 114/55.5
See application file for complete search history.

(56) References Cited

U.S. PATENT DOCUMENTS

| | | | | |
|---|---|---|---|---|
| 4,916,967 A | * | 4/1990 | Nakamura | B62K 23/06 74/489 |
| 6,112,614 A | * | 9/2000 | Yamashita | B62L 3/02 74/489 |
| 6,551,153 B1 | * | 4/2003 | Hattori | B63H 21/213 114/55.5 |
| 2001/0045141 A1 | * | 11/2001 | Shirayanagi | B62M 27/00 74/489 |
| 2011/0035039 A1 | * | 2/2011 | Simard | B60K 26/02 700/101 |
| 2016/0075421 A1 | * | 3/2016 | Grillo | B63H 21/213 114/55.5 |

* cited by examiner

*Primary Examiner* — Lars A Olson
*Assistant Examiner* — Jovon Hayes
(74) *Attorney, Agent, or Firm* — Mesmer & Deleault PLLC; Ross Krutsinger

(57) ABSTRACT

A throttle device for personal watercraft includes a body portion having an arch shape with a central axis extending perpendicular to a top of the arch shape. A first arm extends from the body portion away from the central axis, where the first arm has a first arm end portion for engaging a throttle lever of the watercraft. A second arm extends from the body portion away from the central axis in a spaced-apart relation to the first arm, where the second arm has a second arm end portion for engaging a handgrip of the watercraft. The throttle device is resilient, thereby allowing the arms to be spread apart during installation and biased to return towards a resting position with a resiliency sufficient to maintain a hand-operable throttle lever of the personal watercraft in a desired throttle position.

17 Claims, 7 Drawing Sheets

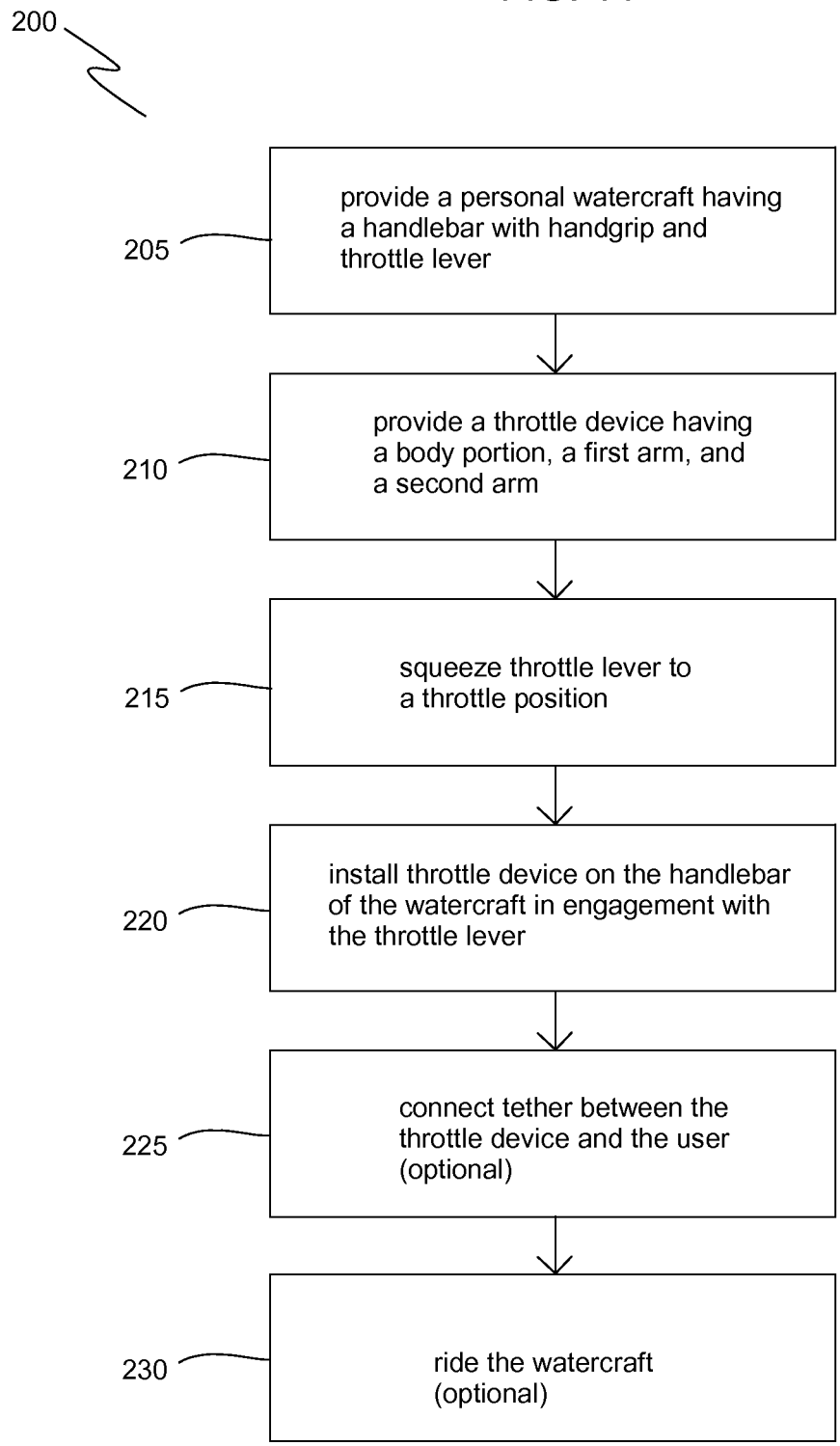

THROTTLE DEVICE AND METHOD FOR PERSONAL WATERCRAFT

BACKGROUND OF THE INVENTION

1. Field of the Invention

The present invention relates generally to throttle devices for motorized vehicles and watercraft. More particularly, the present invention relates to a throttle device useful for maintaining the position of the throttle on a personal watercraft.

2. Description of the Prior Art

Jet skis, Wave Runners®, and other personal watercraft use a throttle lever on the handlebar that the rider squeezes towards the handlebar grip to open the throttle. The rider continually squeezes the throttle to maintain or increase speed across the water and releases the throttle lever to allow the watercraft to assume an idle or neutral condition. For long rides, a feature known as Cruise Assist allows the user to maintain a set throttle position without the need to continually adjust or maintain the throttle lever position. Using Cruise Assist, when the rider reaches a desired speed, the user presses a button. After hearing a beep signal, the speed is set and the user now fully squeezes the throttle lever to the full-throttle position to continue at the set speed. The user may increase or decrease speed by pressing up and down buttons on the handlebar all the while maintaining the throttle in the full-throttle position.

For safety, the watercraft throttle is released and the watercraft resumes idle or neutral if the rider lets go of the throttle. This feature prevents the watercraft from continuing at speed in the event the rider loses grip on the handlebar. Similarly, if the rider is thrown from the watercraft, a lanyard attached from the rider to the key removes the key from the watercraft's key socket, thereby shutting down the engine. For similar safety reasons, the Cruise Assist feature and similar features require the rider to squeeze the throttle in the full-throttle position in order to maintain the set speed.

Even with Cruise Assist or the like, long watercraft rides (e.g., several hours) can become tiresome to the rider's throttle hand due to the need to continue to squeeze the throttle lever and maintain one's arms in an outstretched position. To overcome this problem, riders have resorted to unsafe solutions, such as wrapping a Velcro® strap around the throttle to maintain its position or holding the throttle lever in a fixed position by inserting a stick near its pivot point. These methods defeat the watercraft's normal safety shutoff feature when the rider takes his or her hand away from the throttle lever. This condition is potentially dangerous to the rider and to others.

SUMMARY OF THE INVENTION

The Cruise Assist feature and other available "cruise control" devices or controls of the prior art lack the ability to maintain the watercraft at a set speed or throttle value without the rider maintaining a grip on and squeezing the throttle lever.

Therefore, what is needed is throttle device for maintaining the position of a throttle of a personal watercraft without the need for the rider to squeeze the throttle lever, and preferably without defeating the watercraft's throttle shutoff feature. The present invention achieves these and other objectives by providing a throttle device that is removably attached to the handlebar of a personal watercraft. In one embodiment, a throttle device for personal watercraft includes a body portion having an arch shape with a central axis extending perpendicular to a top of the arch shape. A first arm extends from the body portion away from the central axis. The first arm has a first arm end portion that curves back towards the central axis. A second arm extends from the body portion away from the central axis in a spaced-apart relation to the first arm. The second arm has a second arm end portion that curves back towards the central axis. The throttle device is resilient, thereby allowing the arms to be spread apart during installation and biasing the arms to return towards a resting position with a sufficient resiliency to maintain a hand-operable throttle lever of the personal watercraft in a desired throttle position.

In another embodiment, the body portion defines a body portion dimension (e.g., width, diameter, cross-sectional distance), the first arm defines a first arm dimension along at least a portion of the first arm, and the second arm defines a second arm dimension (e.g., width) along at least a portion of the second arm. The first arm dimension and the second arm dimension are each greater than the body portion dimension.

In another embodiment, the throttle device includes a connector connected thereto, such as to the body portion. In one embodiment, the connector is a ring having a ring opening and encircling the body portion with the ring passing through the general shape of the arch. Optionally, the first arm width and the second arm width are each greater along a portion of the arms near the body portion than an opening of the ring, thereby maintaining the ring's position along the body portion.

In another embodiment, the body portion defines an aperture therethrough where the aperture is sized to receive a connector. Optionally, a connector is attached through the aperture where the connector is a ring, strap, plug or other connector. In one embodiment, the connector is configured to attach to the end of a tether.

In another embodiment, the throttle device includes a tether connected to the body portion.

In another aspect of the invention, a method of throttle control includes the steps of providing a personal watercraft having a handlebar with a hand-operable throttle lever extending along a handgrip; providing a throttle device having a first arm and a second arm each extending from a body portion, where the first arm and second arm are opposed and spaced apart and are configured to releasably attach to the handlebar with the first arm engaging the handgrip and the second arm engaging the hand-operable throttle lever; squeezing the throttle lever to a throttle position, thereby achieving a desired throttle position of the watercraft; and installing the throttle device on the handlebar with the first arm engaging the handgrip and the second arm engaging the hand-operable throttle lever. The throttle device is resilient, thereby allowing the arms to be spread apart as needed during installation and biasing the arms to return towards a resting position with sufficient resiliency to maintain the hand-operable throttle lever in the throttle position.

BRIEF DESCRIPTION OF THE DRAWINGS

FIG. 11 is a flowchart illustrating exemplary steps of one embodiment of a method of throttle control of the present invention.

DETAILED DESCRIPTION OF THE PREFERRED EMBODIMENT

Figure 1:
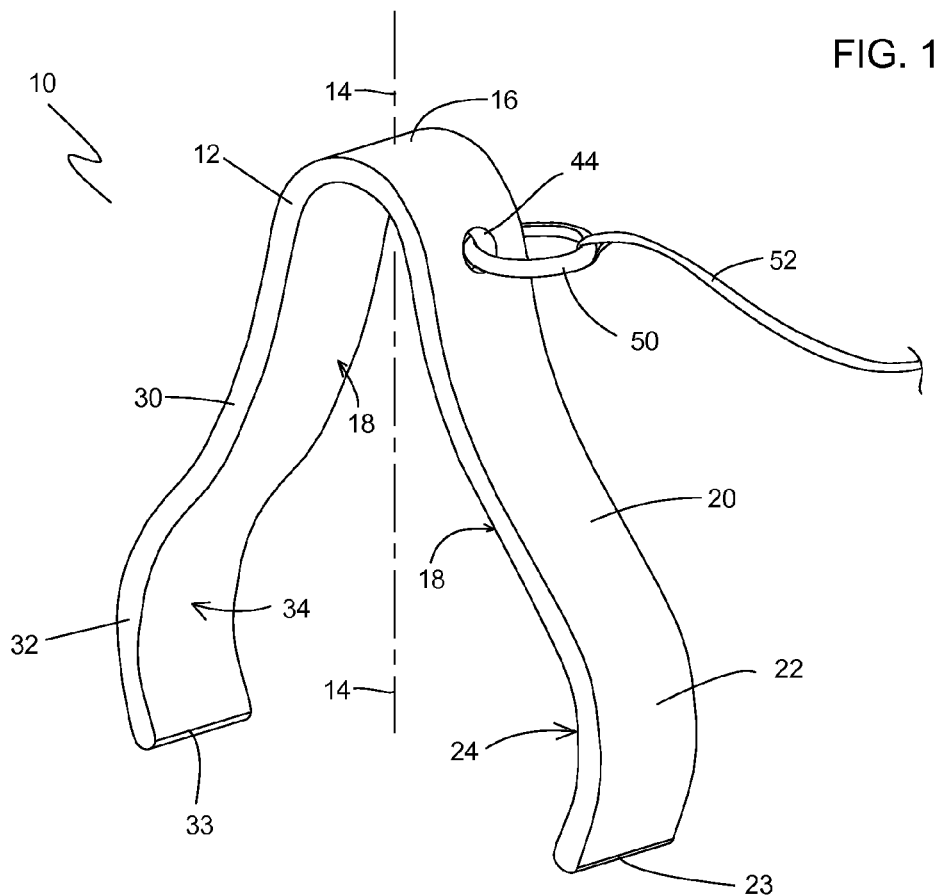
FIG. 1 illustrates a perspective view of one embodiment of a throttle device of the present invention showing an optional aperture, ring connector, and tether.
Figure 2:
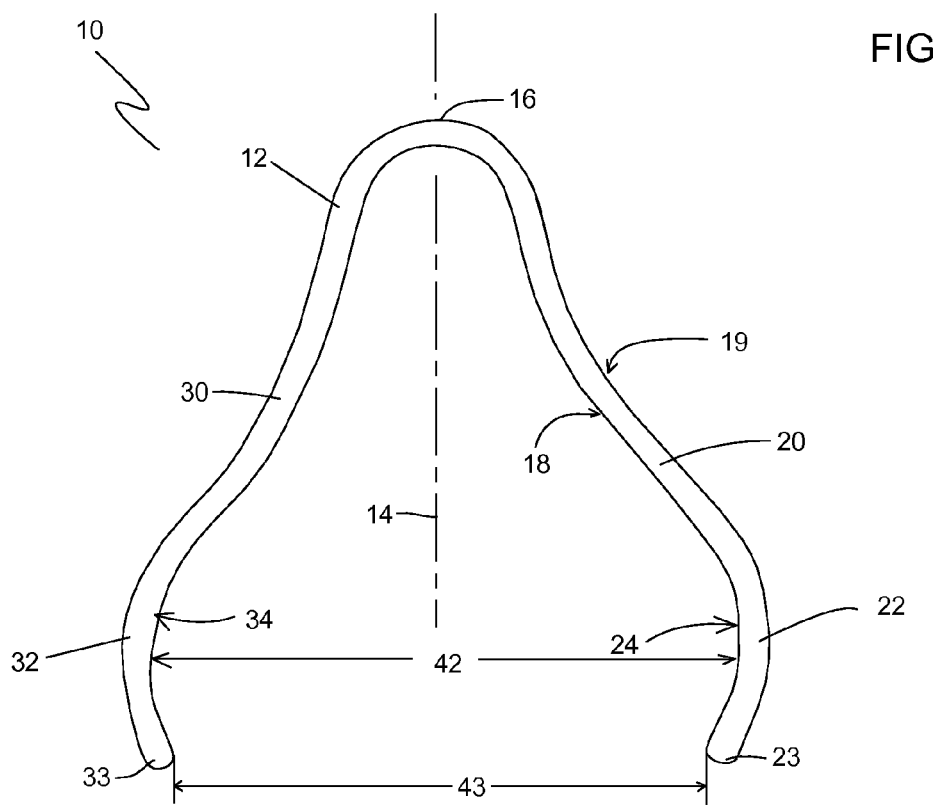
FIG. 2 illustrates an elevational view of the throttle device of FIG. 1, showing the general shape and profile of the device.
Figure 3:
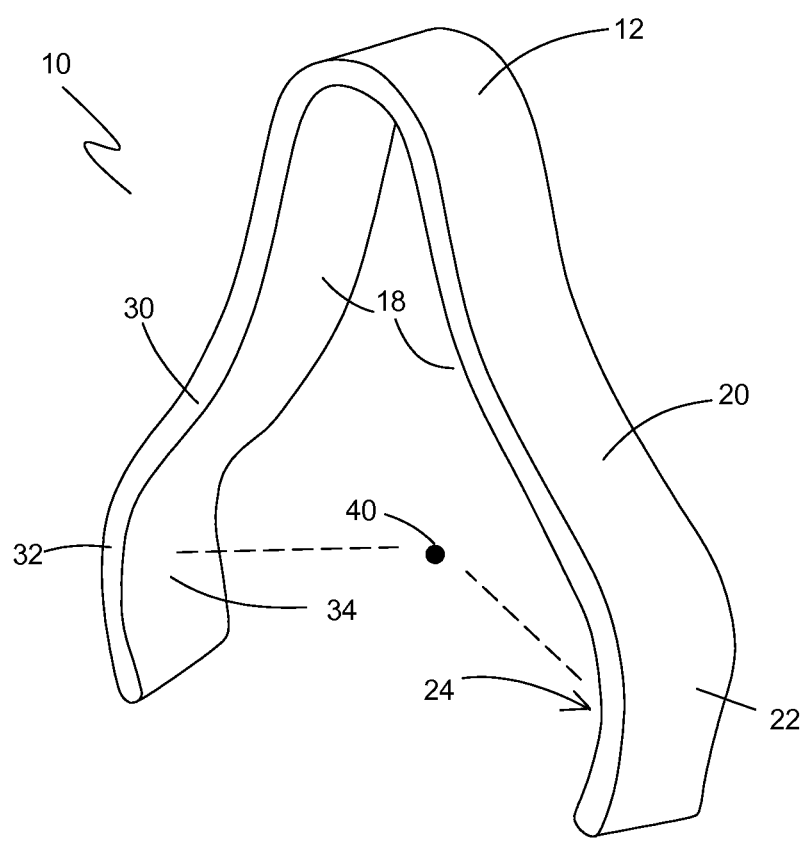
FIG. 3 illustrates a perspective view of another embodiment of a throttle device of the present invention showing first and second arm ends rotated to face towards point 40.

The preferred embodiments of the present invention are illustrated in FIGS. 1-11. FIG. 1 is a perspective view of one embodiment of a throttle device 10 of the present invention. Throttle device 10 is shown in FIG. 1 with an optional ring connector 50 and tether 52, which are discussed in more detail below. FIG. 2 is an elevational view showing the shape and profile of throttle device 10 of FIG. 1.

Throttle device 10 has an open geometry that includes an arched body portion 12, a first arm 20, and a second arm 30. A central axis 14 extends through body portion 12 of throttle device 10 perpendicularly to a top 16 of the arch shape. First arm 20 extends from body portion 12 in a direction away from central axis 14. First arm 20 has a first arm end portion 22 with a tip 23. First arm end portion 22 curves or otherwise changes direction to extend back towards central axis 14, thereby defining a concave first engaging surface 24 along an inside surface 18 of throttle device 10. First engaging surface 24 is sized and shaped to engage a throttle lever 82 of a personal watercraft (shown in FIGS. 7-10). Typically, throttle lever 82 is a rectangular bar having a forward face 82a with a dimension of about ¼ to ½ inch, the forward face 82a being the surface that the user contacts with his or her fingers to squeeze throttle lever 82.

Similar to first arm 20, second arm 30 extends from body portion 12 in a direction away from central axis 14 in an opposed, spaced-apart relation to first arm 20. Second arm 30 has a second arm end portion 32 with a tip 33. Second arm end portion 32 curves or otherwise changes direction back towards central axis 14, thereby defining a concave second engaging surface 34. In one embodiment, second engaging surface 34 is sized and shaped to engage a handlebar handgrip 84 of a personal watercraft with tip 33 wrapping or extending below handgrip 84. Typically, handgrip 84 is cylindrical or oblong with a diameter of about 1.0-1.5 inches. In one embodiment, second engaging surface 34 is optionally curved to substantially match the curve of handlebar handgrip 84 and wrap about one-quarter of the way around handgrip 84. It is also contemplated that second arm 30 may have a straight (uncurved) surface, a straight (un- curved) surface with a ledge member transverse to the arm and extending toward the handgrip and similar configurations.

Figure 9:
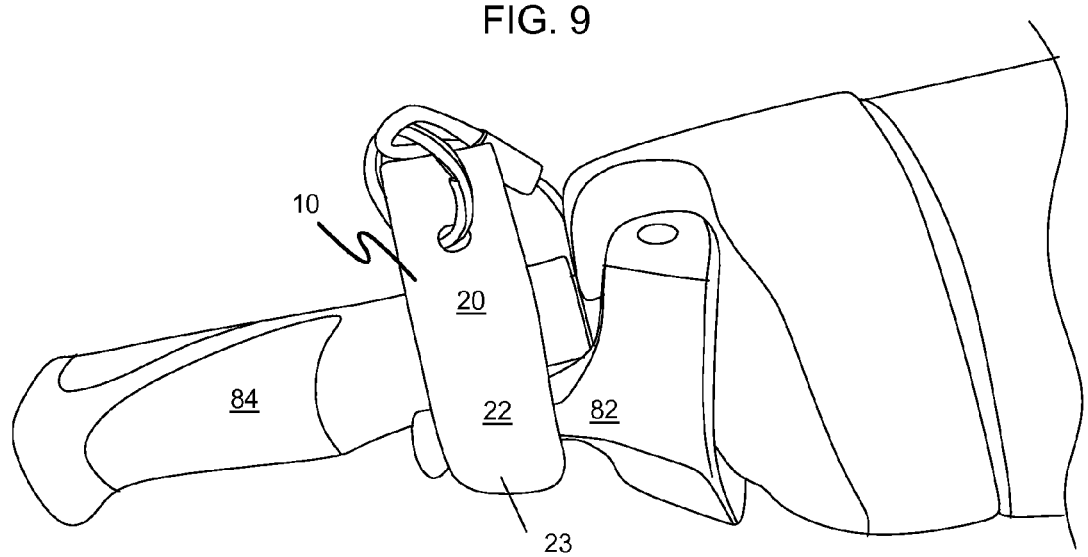
FIG. 9 is a front view of the throttle device shown installed on the personal watercraft.
Figure 10:
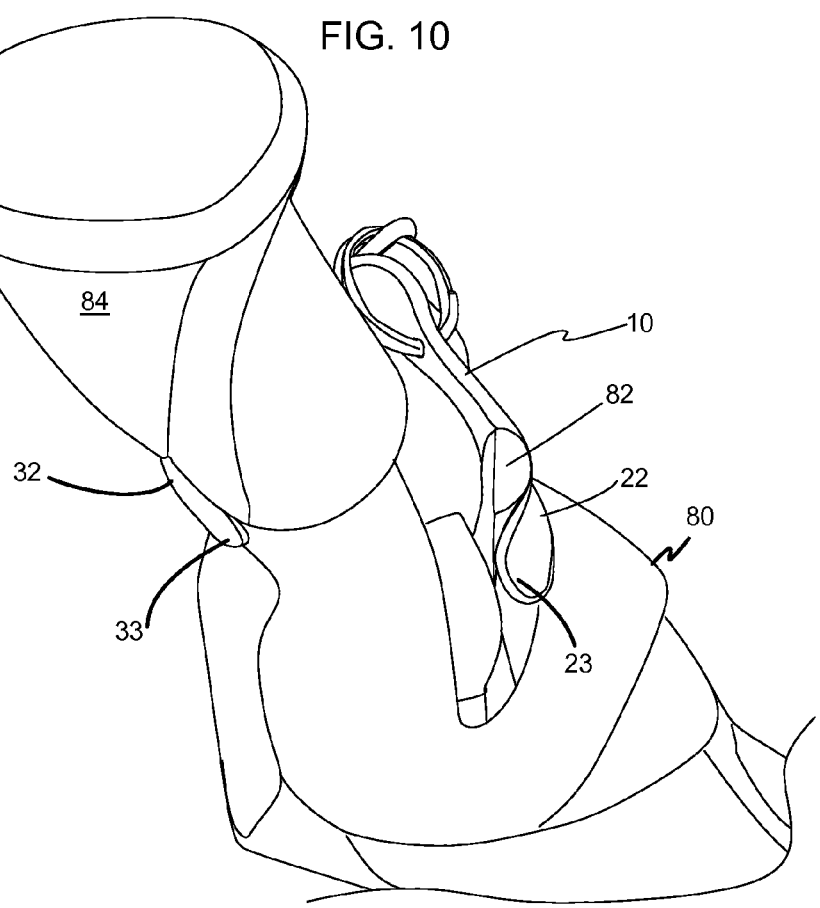
FIG. 10 is a side and bottom perspective view of the throttle device shown installed on the personal watercraft.

The distance 42 between first arm 20 and second arm 30 is its greatest between first engaging surface 24 and second engaging surface 34. This distance 42 is approximately 3.0 inches, where distance 42 accommodates the outside limits of handgrip 84 and throttle lever 82 of a personal watercraft when throttle lever 82 is pivoted towards handgrip 84 in full-throttle position (shown in FIGS. 7-10). Distance 42 may be different for different watercraft. In general, first engaging surface 24 and second engaging surface 34 face each other. In one embodiment shown in FIG. 3, however, first and/or second engaging surfaces 24, 34 are rotated to face towards a common point 40 positioned outside of the region substantially enclosed by inside surface 18 of throttle device 10. In such an embodiment, first arm end portion 22 and/or second arm end portion 32 is twisted somewhat so that first and/or second engaging surfaces 24, 34 face towards common point 40. Accordingly first and second engaging surfaces 24, 34 are shaped to engage the handgrip and throttle lever, which are sometimes angled with respect to each other and have an increasing distance between the handlebar handgrip 84 and throttle lever 82 as handgrip 84 and throttle lever 82 extend outward from the handlebar 80 of a personal watercraft 100 (a portion of watercraft 100, handlebar 80, handgrip 84, and throttle lever 82 are shown in FIGS. 7-10). This configuration also allows throttle device 10 to more closely match the shape of throttle levers 82 that have a curved shape. To facilitate maintaining throttle device 10 on handlebar 80, inside surface 18 of first and second arms 20, 30 is shaped to provide a snug fit between throttle device 10 and throttle lever 82 and handgrip 84. As also shown in FIGS. 9-10, first arm end portion 22 twists slightly to match the curved shape of throttle lever 82.

Throttle device 10 is typically used to maintain throttle lever 82 in the full-throttle position. Some watercraft lack a Cruise Assist or similar feature. In such a case, throttle device 10 is useful to maintain a throttle lever 82 in a desired position somewhere between the fully-released position and the full-throttle position. Throttle device 10 is moved inwardly or outwardly along handgrip 84 and throttle lever 82 for engaging throttle lever 82 and orienting throttle lever 82 between the desired fully-released position and the full-throttle position. This versatility is possible based on a substantially fixed distance 42 between engaging surfaces 24, 34 and the increasing distance from the rear portion 84a of handgrip 84 to the front face 84a of the throttle lever 82 when moving towards the end of the handlebar 80 (shown in FIG. 7).

In one embodiment, throttle device 10 optionally includes one or more through-hole or aperture 44 that extends through body portion 12. Aperture 44 is sized and positioned to receive a ring or other connector 50 therethrough. Aperture 44 is also useful for attaching a flexible tether directly, such as by tying, knotting, or otherwise attaching tether 52 through aperture 44. Aperture 44 can be positioned in any of various locations in body portion 12. In one embodiment, aperture 44 is optionally positioned so that connector 50 connects through aperture 44 and is positioned on the outboard side (towards end of handlebar 80) of throttle device 10. This arrangement provides a visual cue to the user to identify when throttle device 10 is installed on handlebar 80 with the first arm 20 engaging throttle lever 82 and second arm engaging handgrip 84 as intended.

In one embodiment, connector 50 is a ring, such as a split ring, that passes through aperture 44 and enables throttle device 10 to be connected to a tether 52 (tether 52 shown in FIGS. 7-10). When one end of tether 52 is attached to throttle device 10 and the other end of tether 52 is attached to the rider, throttle lever 82 is released if the rider is thrown from the watercraft since tether 52 will pull throttle device 10 off of the handlebar 80. Throttle device 10 therefore has a stiffness resiliency sufficient to maintain throttle lever 82 in the desired position during use, yet resilient enough to be pulled off of the handlebar 80 and release throttle lever 82 in emergencies or in the event the rider falls off of the watercraft or simple where the rider wishes to remove throttle device 10 from the watercraft.

Figure 4:
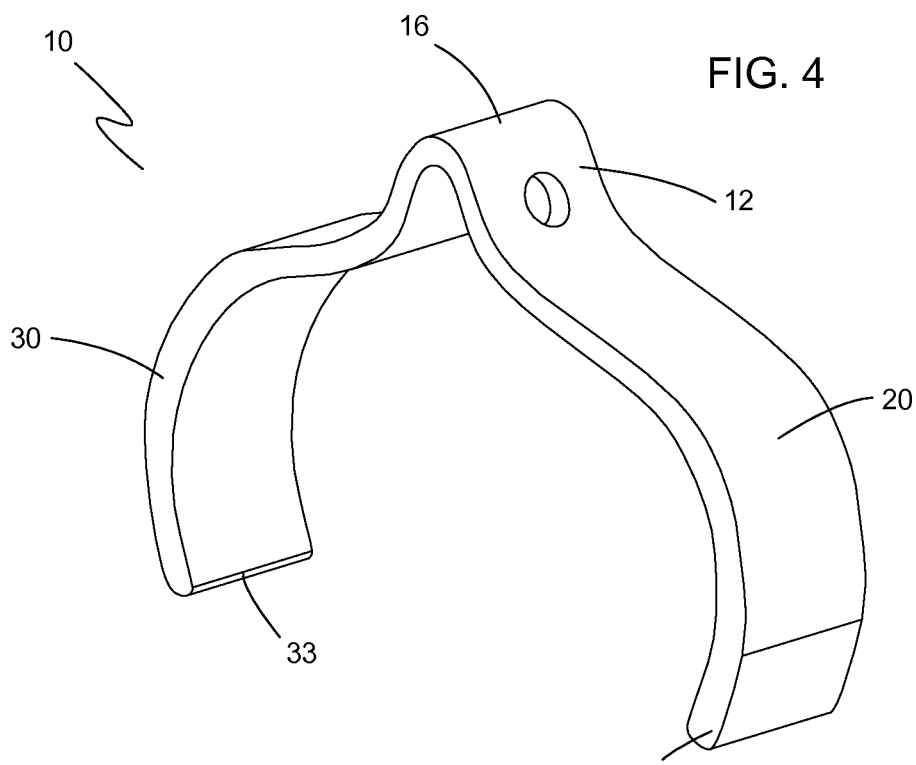
FIG. 4 illustrates a perspective view of another embodiment of a throttle device of the present invention.
Figure 5:
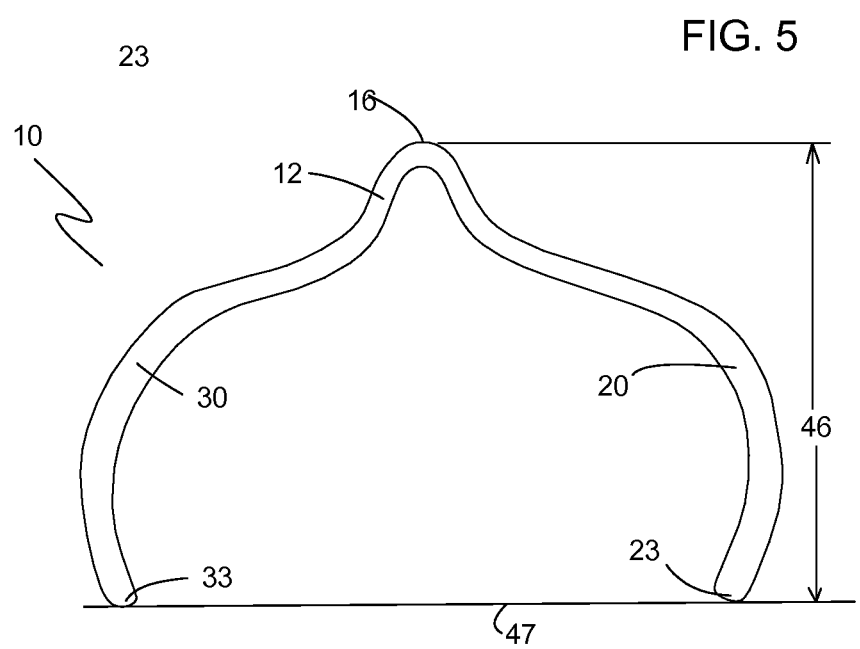
FIG. 5 illustrates an elevational view of the throttle device of FIG. 3.

Referring now to FIGS. 4 and 5, another embodiment of throttle device 10 is shown in perspective and elevational views, respectively. In this embodiment, throttle device 10 has a vertical size 46 from top 16 of body portion 12 to an imaginary line 47 extending along the tips 23, 33 of first and second arms 20, 30, respectively. In such an embodiment, throttle device 10 substantially has a C-shape. While throttle device 10 is shown here with an arched body portion 12, it is contemplated that body portion 12 may have a low or zero profile compared to throttle device 10 as a whole. For example, body portion 12 extends in a straight line or a shallow arc between first arm 20 and second arm 30. The reduced vertical size 46 of this embodiment is advantageous in that it is less likely to be bumped accidentally by the user. Also, the reduced vertical size 46 also provides a smaller feature (i.e., body portion 12) against which the user may inadvertently make contact during aggressive riding or in an accident.

Figure 6:
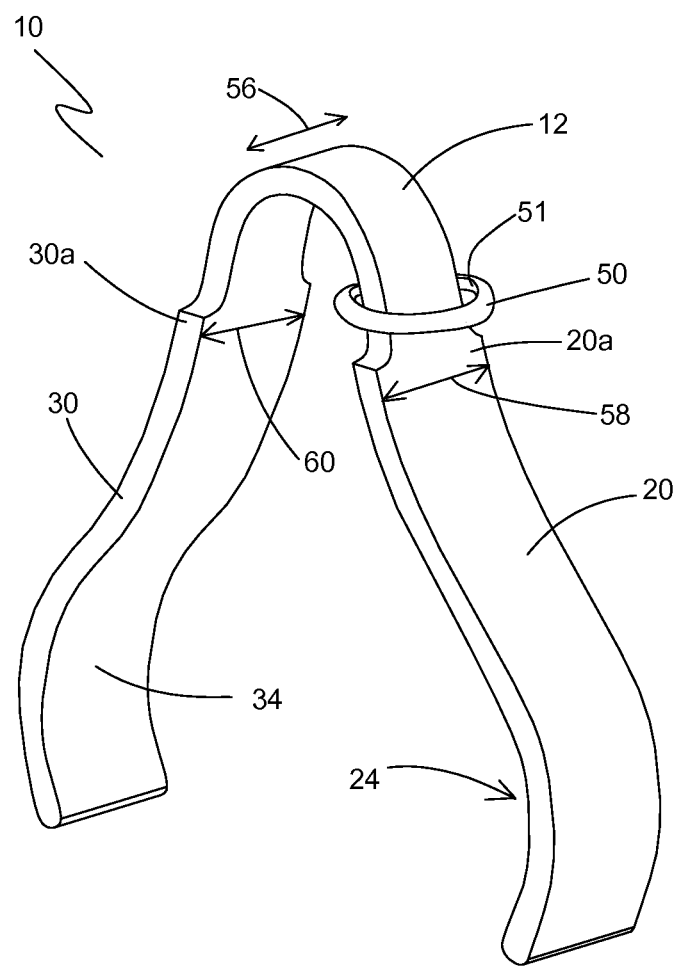
FIG. 6 illustrates a perspective view of another embodiment of a throttle device of the present invention showing various dimensions along the body portion and the arms.

Referring now to FIG. 6, a perspective view of another embodiment of throttle device 10 is shown. In this embodiment, body portion 12 defines a body portion dimension 56 (e.g., width, diameter, or cross-sectional distance). First arm 20 defines first arm dimension 58 along at least a portion 20a of first arm 20 proximate body portion 12. Second arm 30 defines a second arm dimension 60 along at least a portion 30a of second arm 30 proximate body portion 12. Each of first arm dimension 58 and second arm dimension 60 are greater than body portion dimension 56. In one embodiment, a connector 50 is optionally installed around body portion 12 or encircling a portion of body portion 12, such as with connector 50 passing through the arch shape of body portion 12. Connector 50 has a connector opening 51 or maximum inner dimension (e.g., inner diameter) that is smaller than first arm dimension 58 and smaller than second arm dimension 60. Therefore, the position of connector 50 is maintained along body portion 12 and prevented from passing portions 20a, 30a of arms 20, 30, respectively. As a result, connector 50 is prevented from being positioned along first arm 20 or second arm 30 where it may interfere with installation or operation of throttle device 10. Body portion dimension 56, first arm dimension 58, and second arm dimension 60 each refer a width or cross-sectional distance (e.g., diameter or diagonal) across the material. In one embodiment, throttle device 10 includes one or more protrusions (not shown) that extend in any direction from arm(s) 20, 30. Such protrusion(s) prevent connector 50 from migrating to first arm 20 or second arm 30, respectively, and may define first arm dimension 58 and/or second arm dimension 60.

Throttle device 10 is made of a sufficiently resilient material that enables arms 20, 30 of throttle device 10 to be somewhat further separated during installation and where the resiliency of throttle device 10 is sufficient to maintain throttle lever 82 in its full-throttle or other desired position.

In one embodiment, throttle device 10 is made by bending or shaping a flat strip or bar of plastic, such as PVC. Other shapes of material acceptable, such as bars or strips having a rectangular, circular, ellipsoid, or other shape. Other materials are acceptable, including other plastics, wood, metal, etc. First and second engaging surfaces 24, 34 are convexly curved yet substantially flat across their widths; therefore, a bar or flat strip of plastic is useful for forming throttle device 10. Of course, rods and materials with other shapes are also acceptable. First arm end portion 22 and second arm end portion 32 can twisted slightly to face focal point 40 when the material is heated. For example, after forming the general wishbone or pear shape of throttle device 10 using plastic, the plastic is then heated in the region desired to be reshaped. The material is then grasped near an arm end portion 22, 32 with tongs or the like, rotated towards focal point 40, and then allowed to cool with the rotated shape. Throttle device 10 can also be made by injection molding or other methods known in the art.

Figure 7:
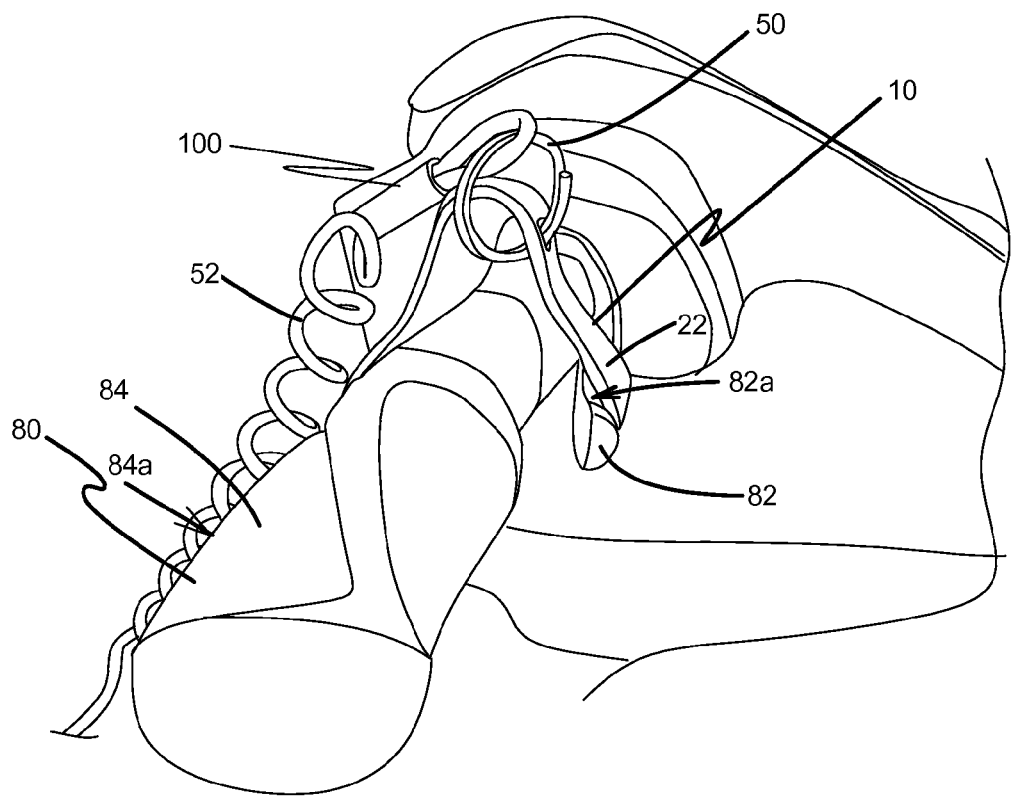
FIG. 7 is a side view of the right-side handlebar of a personal watercraft showing one embodiment of a throttle device of the present invention installed thereon.

FIG. 7 illustrates a side view of one embodiment of throttle device 10 shown installed on a handlebar 80 of a watercraft 100. First engaging surface 24 of first arm 20 engages throttle lever 82. Second engaging surface 34 of second arm 30 engages handgrip 84. Body portion 12 extends above handlebar 80 with tether 52 connected to a split ring connector 50 extending through aperture 44.

Figure 8:
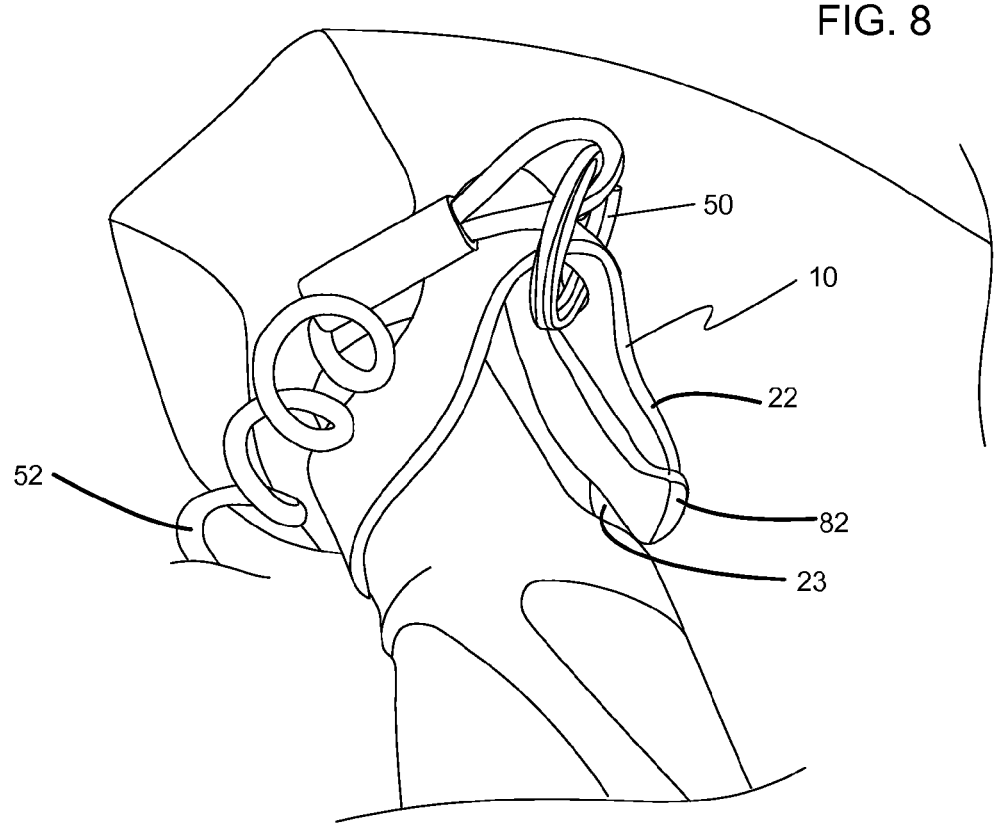
FIG. 8 is a side and rear perspective view of the throttle device shown installed on the personal watercraft.

FIG. 8 illustrates a rear, side perspective view of throttle device 10 of FIG. 7 shown installed on handlebar 80. First arm end portion 22 curves so that tip 23 extends below throttle lever 82.

FIG. 9 illustrates a front view of throttle device 10 of FIG. 7 shown installed on the handlebar 80. First arm end portion 22 is slightly twisted relative to first arm 20 so as to more closely match the shape of throttle lever 82.

FIG. 10 illustrates a side and bottom perspective view of throttle device 10 of FIG. 7 shown installed on handlebar 80. Second arm end portion 32 curves along handgrip 84 with tip 33 positioned below or wrapped under handgrip 84. First arm end portion 22 curves around throttle lever 82 with tip 23 positioned below throttle lever 82. As discussed above with reference to FIG. 2, tip distance 43 between tip 23 of first arm end portion 22 and tip 33 of second arm end portion 32 is smaller than distance 42 between first engaging surface 24 and second engaging surface 34 (shown in FIGS. 1-2). This difference in distance creates a catch mechanism that at least in part prevents throttle device 10 from slipping off of handgrip 84 and throttle lever 82. Optionally, throttle device 10 is coated with a rubber or other material having a high coefficient of friction with handlebar 84 and with throttle lever 82. Such a coating assists in the frictional grip of throttle device 10 to maintain its position on handlebar 80.

Referring now to FIG. 11, a flowchart illustrates exemplary steps of one embodiment of a method 200 of throttle control. In step 205, a user provides a personal watercraft having a handlebar 80 with a hand-operable throttle lever 82 extending along a handgrip 84.

In step 210, the user provides a throttle device, such as throttle device 10, having a first arm 20 and a second arm 30 extending from a body portion 12. The first arm 20 and second arm 30 are opposed and spaced apart from one another. The throttle device 10 is configured to releasably attach to handlebar 80 with first arm 20 engaging handgrip 84 and second arm 30 engaging the hand-operable throttle lever 82. In one embodiment, step 210 optionally includes selecting throttle device 10 having aperture 44 through body portion 12. In another embodiment, step 210 includes selecting throttle device 10 having tether 52 attached thereto. In yet another embodiment, step 210 includes selecting throttle device 10 with connector 50 attached to body portion 12, where connector 50 may pass through aperture 44 through body portion 12 or may encircle a portion of body portion 12.

In step 215, the user squeezes throttle lever 82 to a throttle position, thereby achieving a desired speed or throttle of the watercraft. In one embodiment, the throttle position is the maximum or full-throttle position capable of the watercraft.

In step 220, the user installs throttle device 10 on handlebar 80 with first arm 20 engaging throttle lever 82 and second arm 30 engaging handgrip 84. In one embodiment, installation is performed by the user engaging handgrip 84 with at least tip 33 of second arm 30. While squeezing throttle lever 82 to its full-throttle position (or desired position) the user pivots throttle device 10 forward, while maintaining engagement of second arm 30 against handgrip 84. While pivoting throttle device 10 forward, the user causes at least tip 23 of first arm end portion 22 to extend over and engage throttle lever 82. It may be necessary in some cases to slightly spread apart first and second arms 20, 30 during installation so that handgrip 84 and throttle lever 82 are received between first and second engaging surfaces 24, 34. Of course, throttle device 10 may alternately be installed by first engaging throttle lever 82 and then pivoting throttle device 10 backward to engage handgrip 84.

Having installed throttle device 10 on handlebar 80, the user then optionally adjusts throttle device as needed to seat it with arms 20, 30 returning towards their resting positions, with first engaging surface 24 engaging throttle lever 82, and with second engaging surface 34 engaging handlebar 84. The resiliency of throttle device 10 biases arms 20, 30 to frictionally grip throttle lever 82 and handgrip 84, respectively, and is sufficient to maintain throttle lever 82 in its full-throttle or other desired throttle position.

In optional step 225, the user connects tether 52 between throttle device 10 and the user, such as to the user's life jacket. In one embodiment, step 225 includes connecting tether 52 to connector 50 on throttle device 10. In one embodiment, step 225 includes connecting tether 52 to a kill switch of watercraft 100 and to the user.

In optional step 230, the user rides the watercraft with throttle device 10 installed on handlebar 80 with first arm 20 engaging throttle lever 82 and second arm engaging handgrip 84, thereby maintaining the desired speed and/or throttle position of the watercraft.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

The invention claimed is:

1. In combination, a motorized vehicle and a throttle device, the combination comprising:
    a motorized vehicle having a handle bar with a handgrip and a hand-operable throttle lever extending generally along the handlebar handgrip, the throttle lever operable in a throttle position from a fully-released position to a full-throttle position; and
    a throttle device comprising:
        a body portion with a central axis;
        a first arm extending from the body portion in a first direction away from the central axis and having a first arm end portion curving back towards the central axis; and
        a second arm extending from the body portion in a second direction away from the central axis in a diverging, spaced-apart relation with the first arm, the second arm having a second arm end portion curving back towards the central axis;
    wherein the throttle device is made of a resilient material, thereby allowing the first arm and the second arm to be spread apart during installation on the throttle lever and handgrip, and biasing the first arm and second arm to return towards a resting position with a resiliency sufficient to maintain the throttle lever of the motorized vehicle in a desired throttle position when the throttle lever and the handgrip are received between and engage the first arm and the second arm.

2. The combination of claim 1, wherein at least one of the first arm end portion and the second arm end portion has an engaging surface with a coefficient of friction that is greater than that of the resilient material.

3. The combination of claim 2, wherein the engaging surface comprises a coating.

4. The combination of claim 1, wherein the body portion has an arch shape between the first arm and the second arm and defines a body portion width, the first arm defines a first arm width along at least a portion of the first arm connecting to the body portion, and the second arm defines a second arm width along at least a portion of the second arm connecting to the body portion, wherein the first arm width and the second arm width are each greater than the body portion width.

5. The combination of claim 4, further comprising:
    a ring having a ring opening encircling the body portion; wherein the first arm width and the second arm width are each greater than a size of the ring opening, thereby maintaining the ring on the body portion.

6. The combination of claim 1, wherein the body portion defines an aperture therethrough; and the throttle device further comprises a closed-loop connector installed through the aperture.

7. The combination of claim 6, further comprising:
    a tether with a first tether end attached to the body portion of the throttle device and a second tether end configured for attachment to an user of the motorized vehicle.

8. A method of throttle control comprising:
    providing a motorized vehicle having a handlebar with a hand-operable throttle lever extending generally along a handgrip, wherein moving the throttle lever towards the handgrip opens the throttle;
    providing a throttle device made of a resilient material and having a first arm and a second arm extending from a body portion in a spaced-apart relation from the body portion with a distance therebetween sized to releasably attach to the handlebar with the handgrip and the throttle lever received between the first arm and the second arm and with the first arm engaging the handgrip and the second arm engaging the hand-operable throttle lever;
    squeezing the throttle lever to a throttle position towards the handgrip, thereby opening the throttle; and
    installing the throttle device on the handlebar with the handgrip and the hand-operable throttle lever received between the first arm and the second arm and with the first arm engaging the handgrip and the second arm engaging the hand-operable throttle lever;
    wherein a resiliency of the resilient material is sufficient to permit installing the throttle device on the hand grip and the hand-operable throttle lever and to urge the first arm and the second arm to return towards a resting position to maintain the hand-operable throttle lever in the throttle position.

9. The method of claim 8 further comprising selecting the throttle device having at least one of the first arm end and the second arm end curving back toward a central axis extending through the body portion and between the first arm and the second arm.

10. The method of claim 8 further comprising:
providing a tether with a first tether end and a second tether end;
attaching the first tether end to the body portion of the throttle device; and
attaching the second tether end to an operator of the motorized vehicle.

11. The method of claim 8, wherein the step of providing the throttle device includes selecting the throttle device with the body portion having an arch shape between the first arm and the second arm and defining a body portion width, the first arm defining a first arm width along at least a portion of the first arm connecting to the body portion, and the second arm defining a second arm width along at least a portion of the second arm connecting to the body portion, wherein the first arm width and the second arm width are each greater than the body portion width.

12. The method of claim 11, further comprising:
providing a ring having a ring opening that is smaller than the first arm width or the second arm width; and
installing the ring on the body portion with the ring encircling the body portion.

13. The method of claim 8, further comprising:
selecting the throttle device with the body portion defining an aperture therethrough; and
installing a closed-loop connector through the aperture.

14. A throttle device for a personal watercraft comprising:
a body portion having an arch shape with a central axis extending perpendicular to a top surface of the arch shape;
a first arm extending from the body portion in a first direction down from the body portion and away from the central axis, the first arm portion having a first arm end portion curving back towards the central axis and defining a first engaging surface on an inside surface of the first arm that is sized and shaped to engage a hand-operable throttle lever of a personal watercraft; and
a second arm extending from the body portion in a second direction down from the body portion and away from the central axis in a diverging, spaced-apart relation with the first arm, the second arm having a second arm end portion curving back towards the central axis defining a second engaging surface on an inside surface of the second arm and that is sized and shaped to engage a hand grip of the personal watercraft;
wherein the throttle device is made of a resilient material, thereby permitting installation of the throttle device on the hand-operable throttle lever and handgrip of the personal watercraft and to maintain the hand-operable throttle lever of the personal watercraft in a throttle position set by the user when the hand-operable throttle lever and the handgrip are received between the first arm and the second arm with the first engaging surface engaging the hand-operable throttle lever and the second engaging surface engaging the hand grip.

15. The throttle device of claim 14, wherein the body portion defines a body portion width, the first arm defines a first arm width along at least a portion of the first arm adjacent to the body portion, and the second arm defines a second arm width along at least a portion of the second arm adjacent to the body portion, wherein the first arm width and the second arm width are each greater than the body portion width.

16. The throttle device of claim 15, further comprising:
a closed-loop connector defining a connector opening and installed on the throttle device with the body portion passing through the connector opening, wherein the first arm width and the second arm width are each greater than a size of the connector opening thereby maintaining the closed-loop connector on the body portion.

17. The throttle device of claim 14 further comprising:
a tether with a first tether end attached to the body portion of the throttle device and a second tether end configured for attachment to an user of the personal watercraft.

* * * * *